US012639514B2

(12) United States Patent
Sprott et al.

(10) Patent No.: US 12,639,514 B2
(45) Date of Patent: May 26, 2026

(54) AUTOMATIC THEOREM SOLVER

(71) Applicant: Cavenwell Industrial AI Corp., Richmond (CA)

(72) Inventors: Benjamin Sprott, Richmond, CA (US); Fabio Zanasi, London (GB)

(73) Assignee: CAVENWELL INDUSTRIAL AI CORP.

( * ) Notice: Subject to any disclaimer, the term of this patent is extended or adjusted under 35 U.S.C. 154(b) by 408 days.

(21) Appl. No.: 18/099,126

(22) Filed: Jan. 19, 2023

(65) Prior Publication Data

US 2023/0186021 A1    Jun. 15, 2023

Related U.S. Application Data

(63) Continuation-in-part of application No. 17/551,965, filed on Dec. 15, 2021, now Pat. No. 12,450,507.

(51) Int. Cl.
| | |
|---|---|
| *G06F 40/268* | (2020.01) |
| *G06F 40/40* | (2020.01) |
| *G06N 7/01* | (2023.01) |

(52) U.S. Cl.
CPC ............ G06F 40/268 (2020.01); G06F 40/40 (2020.01); G06N 7/01 (2023.01)

(58) Field of Classification Search
CPC ...... G06F 16/284; G06F 16/288; G06F 16/86; G06F 40/40; G06F 16/221; G06F 16/285; G06F 16/215
USPC ............................................ 707/756; 706/50
See application file for complete search history.

(56) References Cited

U.S. PATENT DOCUMENTS

| | | | | |
|---|---|---|---|---|
| 9,460,189 B2 * | 10/2016 | Meijer | ................. | G06F 16/284 |
| 2010/0100511 A1 | 4/2010 | Hirose | | |
| 2012/0078974 A1 * | 3/2012 | Meijer | ................. | G06F 16/212 |
| | | | | 707/E17.044 |
| 2012/0203540 A1 | 8/2012 | Aue | | |
| 2017/0017670 A1 * | 1/2017 | Meijer | ................. | G06F 16/212 |
| 2020/0285932 A1 * | 9/2020 | Singh | .................... | G06N 5/022 |

OTHER PUBLICATIONS

What are the adjunctions that generate the Giry Monad?' In mathoverflow [online] Jan. 19, 2018; 20:07 EST [retrieved on Feb. 1, 2022] Retrieved from the Internet: <URL: https://mathoverflow.net/questions/291083/what-are-the-adjunctions-that-generate-the-giry-monad>.

(Continued)

*Primary Examiner* — Hung T Vy

(57)    ABSTRACT

Some embodiments of the present disclosure provide a manner for an automatic theorem solver to answer a query. Ahead of time, data that supports columns is received. The data is converted to a data structure. Sets of univariate and multivariate morphisms are then determined and the numbers of morphisms in the sets may be reduced in accordance with various metrics. Additionally, the morphisms may be used to generate chains of morphisms. A plurality of equations may be selected for a category. Upon receiving the morphisms, chains of morphisms and selected equations, the automatic theorem solver may be ready to receive a query. The automatic theorem solver may then determine an answer to the query and present the answer.

14 Claims, 14 Drawing Sheets

(56) References Cited

OTHER PUBLICATIONS

Map from the Multiset Monad to the Giry Monad: From Data to Probabilities.' In mathoverflow [online] Sep. 16, 2018; 15:58 EST [retrieved on Feb. 1, 2022] Retrieved from the Internet: <URL: https://mathoverflow.net/questions/310704/map-from-the-multiset-monad-to-the-giry-monad-from-data-to-probabilities>.

What is the category of algebras for the finitely supported measures monad?' In mathoverflow [online] Oct. 6, 2018; 3:10 EST [retrieved on Feb. 1, 2022] Retrieved from the Internet: <URL: https://mathoverflow.net/questions/312148/what-is-the-category-of-algebras-for-the-finitely-supported-measures-monad>.

What is the Relative Entropy between distributions X and Y , when Y is a function of X ?' In mathoverflow [online] Dec. 5, 2019; 17:35 EST [retrieved on Feb. 1, 2022] Retrieved from the Internet: <URL: https://mathoverflow.net/questions/347686/what-is-the-relative-entropy-between-distributions-x-and-y-when-y-is-a-fu>.

Finding causation in data with Conditional entropy.' In stackexchange [online] Jun. 13, 2019; 14:42 EST [retrieved on Feb. 1, 2022] Retrieved from the Internet: <URL: https://stats.stackexchange.com/questions/412868/finding-causation-in-data-with-conditional-entropy>.

Feature selection via conditional entropy.' In stackexchange [online] Mar. 1, 2019; 20:14 EST [retrieved on Feb. 1, 2022] Retrieved from the Internet: <URL: https://stats.stackexchange.com/questions/395136/feature-selection-via-conditional-entropy>.

Multivariate conditional entropy.' In stackexchange [online] Dec. 31, 2018; 15:42 EST [retrieved on Feb. 1, 2022] Retrieved from the Internet: <URL: https://stats.stackexchange.com/questions/385091/multivariate-conditional-entropy>.

What is the entropy of a composition of Gaussian Processes?' In stackexchange [online] Oct. 17, 2018; 18:47 EST [retrieved on Feb. 1, 2022] Retrieved from the Internet: <URL: https://stats.stackexchange.com/questions/372410/what-is-the-entropy-of-a-composition-of-gaussian-processes>.

Newman, 'Explainability won't save AI' In brookings [online] May 19, 2021 [retrieved on Jan. 12, 2023] Retrieved from the Internet: <URL: https://www.brookings.edu/techstream/explainability-wont-save-ai>.

Shiebler et al., "Category Theory in Machine Learning," arXiv preprint arXiv:2106.07032 (Jun. 13, 2021).

Sadrzadeh, et al., "The Frobenius anatomy of word meanings I: subject and object relative pronouns.", Journal of Logic and Computation, vol. 23, Issue 6, Dec. 2013, pp. 1293-1317 (2013).

Coecke, et al., "Mathematical Foundations for a Compositional Distributional Model of Meaning," arXive-prints, p. arXiv: 1003.4394, Mar. 2010.

Clark, Stephen, Bob Coecke, and Mehrnoosh Sadrzadeh. "A compositional distributional model of meaning." In Proceedings of the Second Quantum Interaction Symposium (QI-2008), pp. 133-140. 2008. (Year: 2008).

* cited by examiner

FROM FIG. 2

402 CONVERT DATA STRUCTURE TO UNIVARIATE MORPHISM

404 ASSOCIATE DATA STRUCTURE WITH A METRIC

406 SELECT A SET OF UNIVARIATE M-MORPHISMS

408 SELECT A MINIMAL SET OF COLUMNS

410 FOR EACH COLUMN IN THE DATA, DETERMINE A MULTIVARIATE M-MORPHISM

412 SELECT A SUBSET OF MULTIVARIATE M-MORPHISMS

TO FIG. 5

FROM FIG. 4

PRODUCE CHAINS OF M-MORPHISMS — 502

SELECT A SUBSET OF CHAINS — 504

OBTAIN A PLURALITY OF EQUATIONS OF A CATEGORY — 506

ASSIGN A METRIC TO EACH EQUATION — 508

SELECT A PLURALITY OF EQUATIONS — 510

TO FIG. 6

FROM FIG. 2

702 — FIND A COMPLETE SET OF KIDM-MORPHISMS

704 — FIND ALL KIDM-MORPHISMS THAT MAP FROM SOME CARTESIAN PRODUCT OF COLUMNS TO ONE OTHER COLUMN OR A PLURALITY OF OTHER COLUMNS

706 — DETERMINE A SET OF KIDM-MORPHISMS WITH CERTAIN QUALITIES

708 — SELECT SOME KIDM-MORPHISMS

710 — PROVIDE SOFTWARE AND KIDM-MORPHISMS

END

AUTOMATIC THEOREM SOLVER

CROSS-REFERENCE TO RELATED APPLICATION

The present application is a continuation-in-part application of U.S. patent application Ser. No. 17/551,965, filed Dec. 15, 2021, the contents of which are hereby incorporated herein by reference.

TECHNICAL FIELD

The present disclosure relates, generally, to theorem solving and, in particular embodiments, to preparing and implementing an automatic theorem solver.

BACKGROUND

Artificial Intelligence (AI) may be shown to suffer from a problem of explainability, where deep neural networks and predictive algorithms act like black boxes that do not offer reasons for the directives and predictions they provide to their users. When faced with a choice of accepting the directive provided by a modern AI system, a traditional decision-maker faces a dilemma, even if the accuracy of the AI system has been demonstrated. This dilemma relates to whether to leave the decision making, increasingly, to the algorithms and, by extension, to the engineers and statisticians responsible for developing the algorithms. One concern is that the engineers and statisticians suffer from a lack of domain knowledge. For this reason, there exists a problem in that the traditional decision-makers may be shown to be hesitant to adopt AI-based predictive and directive tools.

Many tactics have been developed to solve this problem. The tactics may be said to fall under the moniker of "Explainable AI." Three tactics, chosen from a list of 17 "Explainable AI" algorithms, are called: Decision trees; Rule lists; and LIME. A recent report out of Brookings (see www.brookings.edu/techstream/explainability-wont-save-ai/) indicates that engineering needs, rather than the needs of traditional decision-makers, are the focus of each of these tactics and most other Machine Learning (ML) research. Indeed, one passage, in Current Explainability efforts, reads, "Two of the engineering objectives—ensuring efficacy and improving performance—appear to be the best represented. Other objectives, including supporting user understanding, . . . , are currently neglected."

SUMMARY

Some embodiments of the present disclosure provide a manner for an automatic theorem solver to answer a query. Ahead of time, data that supports columns is received. The data is converted to a data structure. Sets of univariate and multivariate morphisms are then determined and the numbers of morphisms in the sets may be reduced in accordance with various metrics. Additionally, the morphisms may be used to generate chains of morphisms. A plurality of equations may be selected for a category. Upon receiving the morphisms, chains of morphisms and selected equations, the automatic theorem solver may be ready to receive a query. The automatic theorem solver may then determine an answer to the query and present the answer.

According to an aspect of the present disclosure, there is provided a method for answering a query at a system implementing an automatic theorem prover. The method includes receiving data that supports columns, cleaning the data, binning the data and processing the data, thereby producing processed data. The method further includes, for each pair of columns in the processed data, converting the pair to a data structure, modeling the data structure as a morphism in a category, M, that supports a faithful functor, $F:Cat \rightarrow M$, where Cat is the category of small categories, thereby generating a plurality of M-morphisms, converting the plurality of M-morphisms into a corresponding plurality of univariate M-morphisms, associating, with each univariate M-morphism in the plurality of univariate M-morphisms, a data structure metric and selecting, for each column and from the plurality of univariate M-morphisms, a set of univariate M-morphisms, wherein the selecting is based on the data structure metric. The method further includes establishing, for each column, a multivariate M-morphism based on the univariate M-morphisms in the set of univariate M-morphisms that have the each column as a target, associating, with each multivariate M-morphism, a multivariate decision metric, selecting, from the plurality of multivariate M-morphisms, a subset of multivariate M-morphisms, wherein the selecting is based on the multivariate decision metric. The method further includes using the set of univariate M-morphisms and the multivariate M-morphisms to produce a plurality of chains of M-morphisms using morphism composition law in the category, M, and select, from among the plurality of chains of M-morphisms, a subset of chains of M-morphisms, thereby producing a selected subset of chains of M-morphisms. The method further includes obtaining a plurality of equations of a finitely presented category, assigning an equation metric to each equation in the plurality of equations and selecting a plurality of selected equations among the plurality of equations. The method further includes providing, to the automatic theorem prover, axioms of the category, M, and a definition of one or more monoidal products defined in the category, M and axioms associated with the one or more monoidal products, importing, to the automatic theorem prover, the set of univariate M-morphisms, the multivariate M-morphisms, the selected subset of chains of M-morphisms and the plurality of selected equations, receiving, at the automatic theorem prover, a query and determining, at the automatic theorem prover, an answer to the query, wherein the determining the answer is based on: the set of univariate M-morphisms; the subset of multivariate M-morphisms; the selected subset of chains of M-morphisms; the plurality of selected equations; the data structure metrics; the multivariate decision metrics; and the equations metrics. The method further includes providing, at the automatic theorem prover and responsive to the receiving the query, the answer.

According to an aspect of the present disclosure, there is provided a method for providing verification of a natural language sentence. The method includes receiving a plurality of morphisms, receiving the natural language sentence and analyzing the natural language sentence to select a subset of morphisms from among the plurality of morphisms, obtain a chain of the subset of morphisms and obtain an input discrete probability distribution. The method further includes obtaining, by processing the input discrete probability distribution using the chain of the subset of morphisms, an obtained output discrete probability distribution, determining, from the obtained output discrete probability distribution, that the natural language sentence has been verified and providing, as output, an indication that the natural language sentence has been verified.

BRIEF DESCRIPTION OF THE DRAWINGS

For a more complete understanding of the present embodiments, and the advantages thereof, reference is now made, by way of example, to the following descriptions taken in conjunction with the accompanying drawings, in which.

DETAILED DESCRIPTION OF ILLUSTRATIVE EMBODIMENTS

Figure 1:
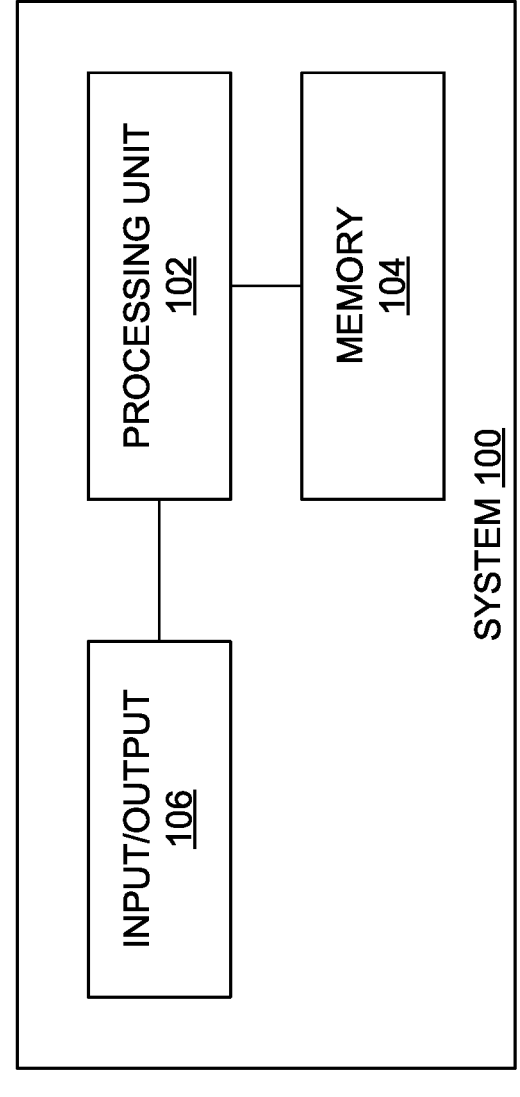
FIG. 1 illustrates, in a block diagram, a system for implementing an automatic theorem solver, in accordance with aspects of the present application.

For illustrative purposes, specific example embodiments will now be explained in greater detail in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include, or otherwise have access to, a non-transitory computer/processor readable storage medium or media for storage of information, such as computer/processor readable instructions, data structures, program modules and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e., DVDs), Blu-ray Disc™, or other optical storage, volatile and non-volatile, removable and non-removable media implemented in any method or technology, random-access memory (RAM), read-only memory (ROM), electrically erasable programmable read-only memory (EE-PROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

When an engineer interacts with data, the engineer may discover that the data may be organized into what are called "columns." A column may be defined as a long list of data, where the ordering of the list may have no meaning. An example of a column might be the reading of a parameter over a number of different serial numbers.

Aspects of the present application relate to a software system that is designed to enhance the abilities of engineers in industrial settings. Such enhancements are expected to allow the engineers to better understand their products and make improvements to their products based on existing data. Aspects of the present application relate to providing a way for a given engineering firm to automatically generate a category that embodies a theory of their products. Conveniently, such automatic generation may be achieved using data already stored in databases maintained by the given engineering firm. Aspects of the present application relate to converting this data into a probabilistic category with likely axioms. Regression of a finitely presented category from the data may be shown to allow for the creation of an interactive tool that may be shown to allow engineers to more powerfully and more completely reason about their products. Once the algebra of the finitely presented category has been determined, the finitely presented category may be combined with an automatic theorem prover as a core engine for an interactive assistant.

As a starting point, it may be considered that a column is a multiset, m, over a set, S. It may be shown that all multisets over a set may be described by a multiset monad, $(\mathcal{M}, \mu, \eta)$. It may also be shown that any pair of columns is a map in a Kleisli category, $K_{\mathcal{M}}$, of the multiset monad. Composition of columns is given by a composition rule of the Kleisli category, $K_{\mathcal{M}}$, of the multiset monad. It may further be shown that there exists a natural transformation from the multiset monad to a monad of measures of finite support. This natural transformation may be shown to induce a natural transformation on the Kleisli category, $\mathcal{N}$: $K_{\mathcal{M}} \to K_{fin}$, where $K_{fin}$ is the Kleisli category for the monad of measures of finite support. Notably, $K_{fin}$ may also be referred to as "the Distribution Monad." Indeed, the Kleisli category for the monad of measures of finite support, $K_{fin}$, is arguably a category of sets and stochastic matrices. Conditional entropy is known to be a map from $K_{fin}$ to $\mathbb{R}$. The conditional entropy of a map in the Kleisli category for the monad of measures of finite support, $K_{fin}$, may be understood to be a measure that defines a degree to which a map in the Kleisli category of the multiset monad, $K_M$, represents a function. When an M-morphism exactly represents a function, it is called a deterministic morphism as we see in Shiebler, Dan, Bruno Gavranović and Paul Wilson, "Category Theory in Machine Learning," arXiv preprint arXiv: 2106.07032(2021). The conditional entropy for a map, f, is zero if the map, f, exactly specifies a function. A composition for maps in the Kleisli category for the monad of measures of finite support, $K_{fin}$, may be obtained by matrix multiplication.

Given a set, C, of all columns in a database, D, one can define a C×C matrix. Each element of the C×C matrix may be identified with maps in the Kleisli category for the monad of measures of finite support, $K_{fin}$. Each element of the C×C matrix may be mapped to $\mathbb{R}$ using conditional entropy. The lowest ten percent of column pairs with respect to conditional entropy may then be selected.

Using the knowledge of the columns from which column pairs are selected, a set, Com, of all valid composites may be constructed. Then, using a metric of similarity between morphisms in the Kleisli category for the monad of measures of finite support, $K_{fin}$, the top ten percent of equations may be selected. That is, the top most likely commutative triangles are selected. The selected equations may be shown to be of the form f·g=h. The same process may be used to obtain the top ten percent of commutative squares. One way to define the degree to which two maps in the Kleisli category for the monad of measures of finite support, $K_{fin}$, are the same is by adding up a Kullback-Leibler divergence at each element of the X in the map definition of X→M(Y).

One problem when comparing column pairs (C×C vs. D×D) is that the availability of a pair of data columns does not guarantee the availability of enough information to fully specify the Kleisli map f:X→FIN(X), where FIN is a functor of the monad of measures of finite support, $K_{fin}$. This is because the value of the function at x∈X may not have ever been measured. For this reason, some missing data is to be filled in pairs of columns that are to be compared. To carry out this data filling, the column pairs C×C and D×D may be reviewed. Upon finding a domain value, x, in the column pair C×C but not in the column pair D×D, then domain value, x, may be added to the column pair D×D, using uniform distribution.

Notably, the entire set, X, from which the columns are sampled need not be covered. Instead, coverage may be limited to a maximum subset of domain values that appear in all the columns.

Thus, given two maps f and g in the Kleisli category for the monad of measures of finite support, $K_{fin}$, if KL(f, g) is the Kullback-Leibler divergence between distributions f(x) and g(x), then a similarity between maps f and g is a real value given by $$S(f, g) = \sum_{x \in X} KL(f(x), g(x))$$

This value of the similarity, S(f, g), is expected to go to zero in the case wherein the maps f and g represent the same information about the same function.

FIG. 1 illustrates elements of a system 100 configured to implement aspects of the present application. The system 100 includes a processing unit 102 with an associated memory 104. The system 100 also includes an input/output interface 106.

Figure 2:
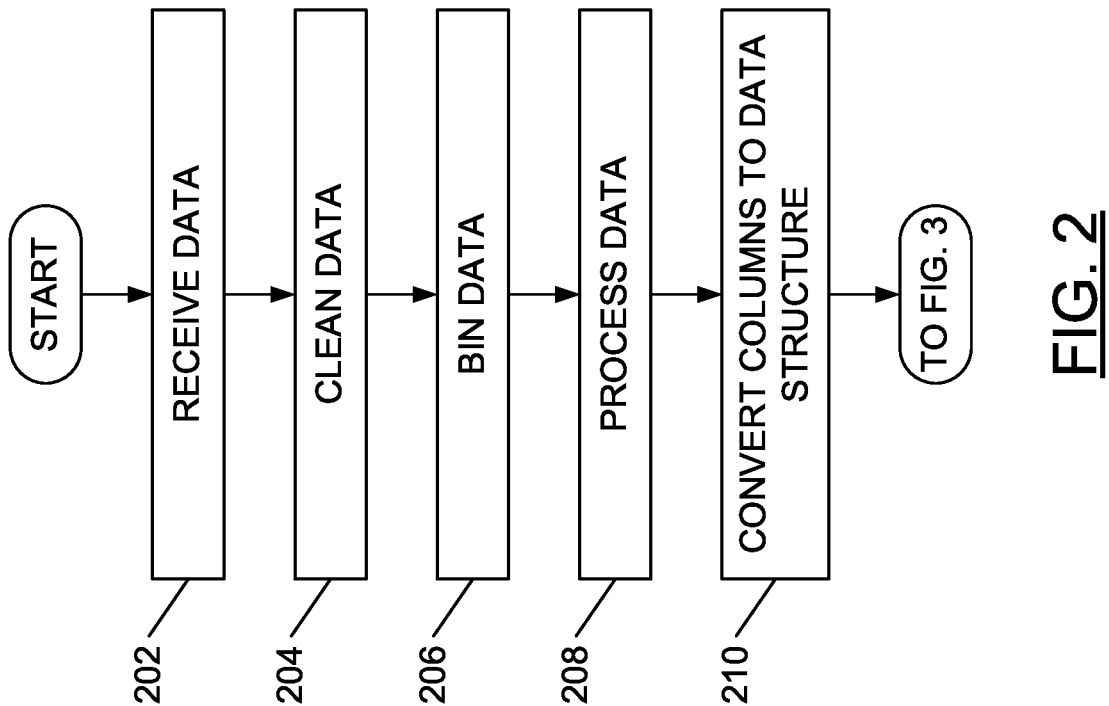
FIG. 2 illustrates example initial steps in a method of answering a query, in accordance with aspects of the present application.

FIG. 2 illustrates example initial steps in a method of answering a query.

The method of FIG. 2 begins with the system 100 of FIG. 1 receiving (step 202) data that supports columns. Receiving (step 202) the data may also be called "reading in" the data. As discussed hereinbefore, a column may be defined as a long list of data, where the ordering of the list may have no meaning. An example of a column might be the reading of a parameter over a number of different serial numbers.

Upon receiving (step 202) the data, the system 100 may clean (step 204) the data. The cleaning (step 204) the data may, for example, involve removing a not-a-number. The cleaning (step 204) the data may, for example, involve removing a constant column. The cleaning (step 204) the data may, for example, involve removing an outlier.

The system 100 may also bin (step 206) all real number data into a number, N, of bins. The binning (step 206) of the data may be accomplished in a conventional manner.

The system 100 may process (step 208) the data to reduce the data to include only those pairs of interest. The processing (step 208) of the data may, for example, include removing, from the data, pairs for which the first column, $C_1$, contains elements that are unique. The processing (step 208) of the data may, for example, include removing, from the data, pairs for which all the elements of the second column, $C_2$, are the same. The processing (step 208) of the data may, for example, include removing, from the data, pairs wherein the first column, $C_1$, is approximately equal to the second column, $C_2$. That is, the first column, $C_1$, may be compared to the second column, $C_2$, in a manner that generates an equality score. Determining that the two columns are approximately equal may involve comparing the equality score to an equality threshold.

Figure 3:
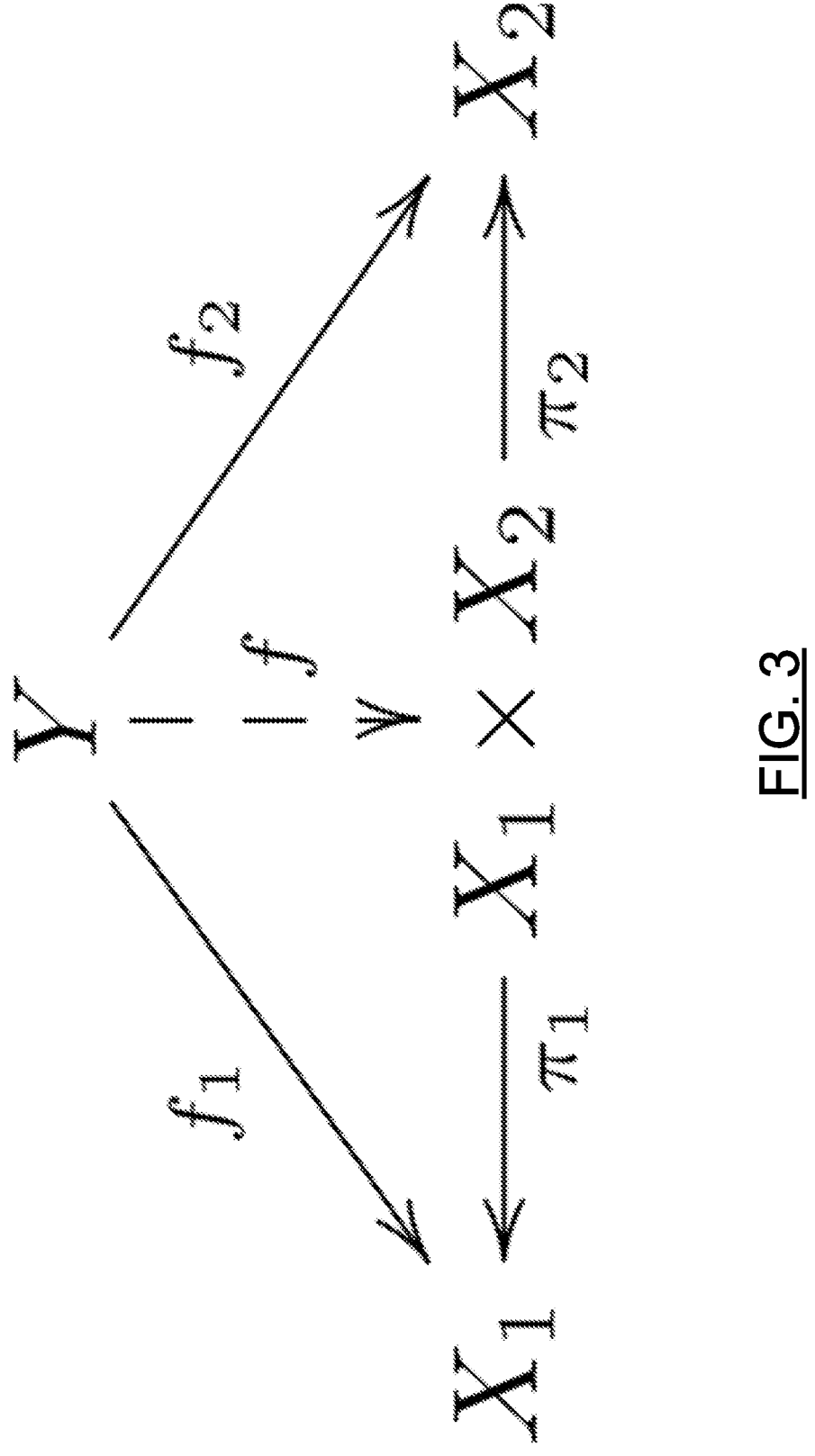
FIG. 3 illustrates a diagram showing a cartesian product in a category.

By way of the processing (step 208) of the data, the system 100 may obtain one or more universal constructions. Universal constructions are known to appear frequently in categories (See ncatlab.org/nlab/show/universal+construction and en.wikipedia.org/wiki/Universal_property). The prototypical example of a universal construction is the universal construction of the Cartesian Product in the Category of Sets. Other examples of universal constructions include Limits/Colimits, Kan Extensions and Adjoint Functor. The Cartesian product is an example of a limit and can be detected in a data set consisting of rows and columns. FIG. 3 illustrates a diagram showing a cartesian product in a category. In FIGS. 3, X, Y, $X_1$ and $X_2$ are objects in the category. $X_1 \times X_2$ is the product of the objects $X_1$ and $X_2$. There are morphisms $f_1$, f and $f_2$. For the object labelled $X_1 \times X_2$ to be the product of objects $X_1$ and $X_2$, it must be the case that the diagram in FIG. 3 commutes. This means that every path along the morphisms must be equal. There is a path from Y to $X_1 \times X_2$ to $X_1$ and the path is traversed by "going along" the morphism f, then along the morphism $\pi_1$. One can also get from Y to $X_1$ by going along the morphism $f_1$. These two paths have to be the same, so $f \cdot \pi_1 = f_1$; likewise, $f \cdot \pi_2 = f_2$. The exact definition is as follows: For every object Y and every pair of morphisms $f_1$:Y=→$X_1$, $f_2$:Y→$X_2$, there exists a unique morphism $f_1$:Y→$X_1 \times X_2$ such that diagram in FIG. 3 commutes. In any given data set, there is always only one map between columns, thus f is always unique, so one only verifies the two equations. This verification can be done with an algorithm disclosed herein, where chains and equations are computed. The verification will apply to any limit or colimit.

Each pair of columns $[C_1, C_2]$, including a first column, $C_1$, and a second column, $C_2$, may be converted (step 210) to a data structure, K. Preferably, the data structure, K, can be modeled as a morphism in a category, M, that supports a faithful functor F: Cat→M, where Cat is the category of small categories. The category, M, may be a Markov category.

Figure 4:
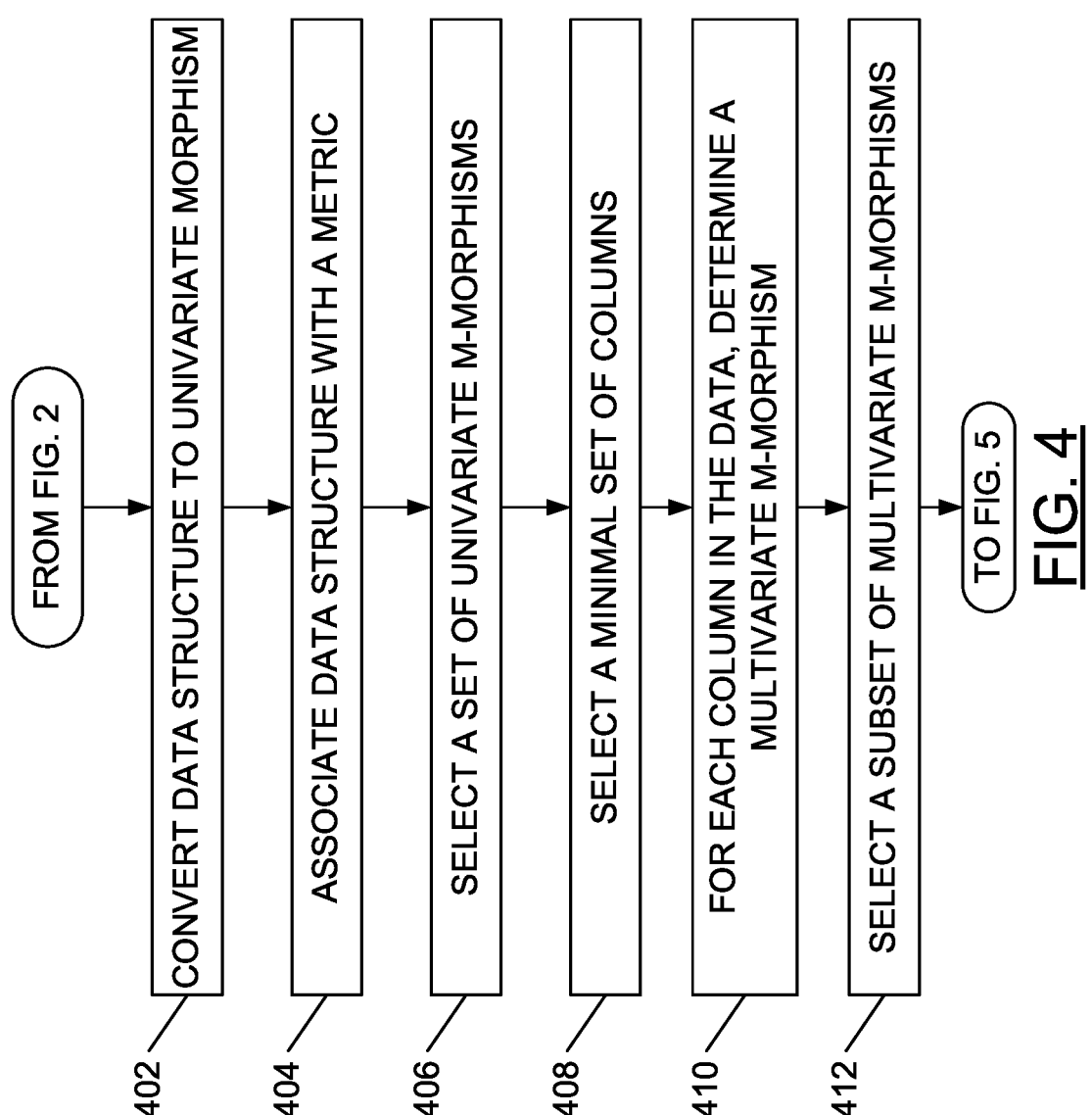
FIG. 4 illustrates example steps in the method started in FIG. 2, in accordance with aspects of the present application.

FIG. 4 illustrates example steps in the method started in FIG. 2. For each pair of columns remaining in the processed data, the system 100 may convert (step 402) the data structure, K (already modeled as a morphism in a category, M), to a univariate morphism. The univariate morphism may, for example, be a univariate morphism in the Kleisli category of the Distribution Monad (KIDM).

The system 100 may then associate (step 404) the data structure, K, with a data structure metric, m.

For every column, $C_1$, in the processed data, the system 100 may select (step 406) a set, $SC_1$, of univariate M-morphisms. Notably, the codomain of each of the univariate M-morphisms in the set, $SC_1$, is $C_1$. The selecting (step 406) may be based on the data structure metric, m, associated, in step 404, with the data structure, K, that was converted (step 402) to the univariate M-morphism.

Given a target column, T, where every univariate M-morphism selected in step 406 has target column, T, as its target, a minimum spanning tree algorithm may be performed, using these univariate M-morphisms, to select (step 408) a minimal set of source columns (called "$S_T$") that are to be used in the subsequent step (step 410), which relates to determining an original multivariate M-morphism whose target is target column, T.

The original multivariate M-morphism may be called "$f_T$" such that the original multivariate M-morphism may be represented as fτ: $S_T$→T, with a set of source nodes (columns), $S_T$, and a target node (column), T. The multivariate M-morphism, $f_T$, may be considered to be a directed graph in at least two ways. In one way, the multivariate M-morphism, $f_T$, may be considered a directed graph, G1, that is a collection of directed edges pointing into a target node, T, with each edge coming from a separate source node in the set of source nodes, $S_T$. In another way, the multivariate M-morphism, $f_T$, may be considered a bigger directed graph, G2, that contains the graph G1, but includes all the edges between the columns/nodes in the set of source nodes, $S_T$. Furthermore, the original multivariate M-morphism, $f_T$, may be converted into a circuit by using substitution, thereby reducing the number of elements in the set, $S_T$, of source columns. The conversion may be regarded as converting the original multivariate M-morphism, $f_T$, to a converted multivariate M-morphism, $$f_T'.$$

The converted multivariate M-morphism, $$f_T',$$

may be regarded as a circuit wherein the minimal set, $S_T$, of source columns is replaced with a smaller set, $$s_T',$$

of source columns.

The smaller set, $$s_T',$$

of source columns may be found as a set of nodes with no incoming edges. That is, nodes that have no causal precursors. Finding a set of nodes with no incoming edges may be accomplished by starting at each node in the graph and proceeding backwards (i.e., in the reverse direction of the arrow of the directed graph) until a node that has no incoming edges is encountered. These nodes (columns) with no incoming edges have no causal precursors and may, accordingly, be considered to be part of the smaller set, $$s_T',$$

of source columns.

The original multivariate M-morphism, $f_T$, may then be discarded and, instead, the converted multivariate M-morphism, $$f_T',$$

may be kept, where $$f_T': s_T' \to T.$$

This dimensionality reduction may be performed for each multivariate M-morphism using both the standard composition rule in the category, M, and composition according to one or more monoidal products defined in the category, M.

The system 100 may next determine (step 410) a multivariate M-morphism. Determining (step 410) the multivariate M-morphism may be based on the univariate M-morphisms, $C_1$, in the set, $SC_1$, of univariate M-morphisms that have a codomain that is a specific column, T. The system 100 may, additionally, perform dimensionality reduction on the determined multivariate M-morphism, as described in the preceding, and may associate, with the multivariate M-morphism, a multivariate decision metric, $m_{mult}$.

The system 100 may select (step 412), from the plurality of multivariate M-morphisms, a subset of multivariate M-morphisms, wherein the selecting is based on the multivariate decision metric, $m_{mult}$. The system 100 may select (step 412) a predetermined proportion of the multivariate M-morphisms that are associated with optimum values for the multivariate decision metric, $m_{mult}$. The selecting (step 412) may involve selecting the multivariate M-morphisms associated with a value of the multivariate decision metric, $m_{mult}$, below a multivariate M-morphism threshold. The multivariate decision metric, $m_{mult}$, may, for one example, be implemented as a conditional-entropy-based decision metric. The multivariate decision metric, $m_{mult}$, may, for another example, be implemented as a mutual-information-based decision metric.

Figure 5:
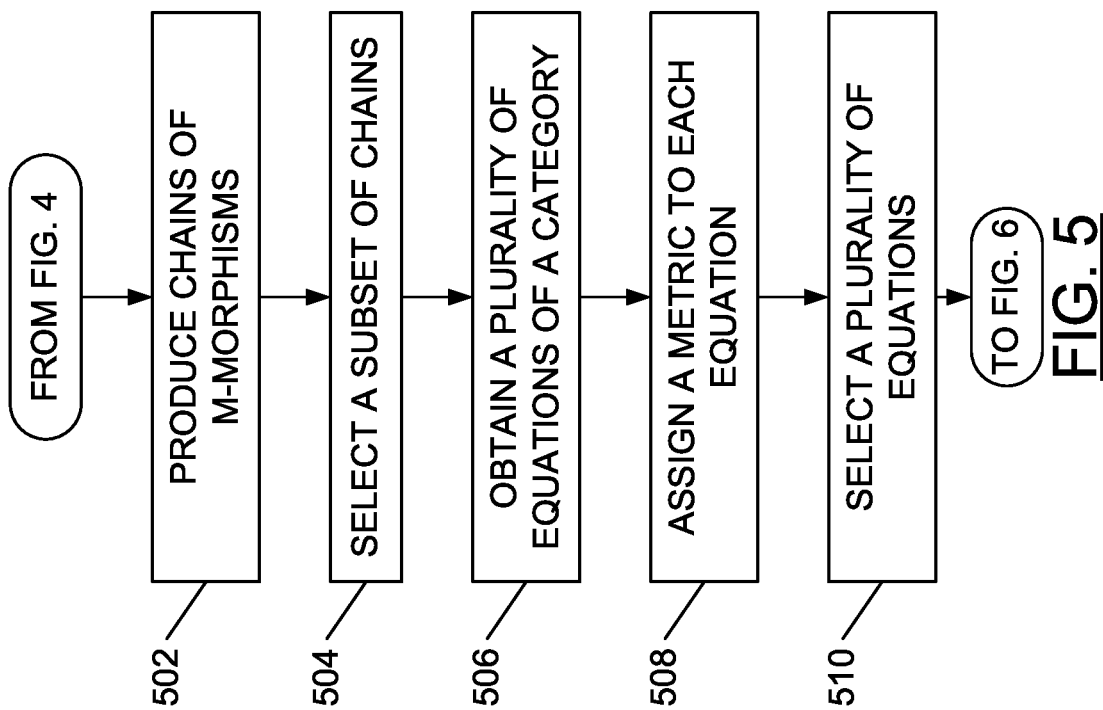
FIG. 5 illustrates example steps in the method continued in FIG. 4, in accordance with aspects of the present application.

FIG. 5 illustrates example steps in the method continued in FIG. 4. The system 100 may produce (step 502) a plurality of chains of M-morphisms. In particular, producing (step 502) the plurality of chains of M-morphisms may involve using the univariate M-morphisms and the selected multivariate M-morphisms. More particularly, the system 100 may use a morphism composition law, in the category, M, to produce (step 502) the plurality of chains of M-morphisms. The system 100 may also produce circuits, rather than just the chains produced in step 502, using both the morphism composition law, in the category, M, and one or more monoidal products defined the category, M.

Producing (step 502) the plurality of chains of M-morphisms may involve carrying out a recursive, depth-first graph traversal. For a given M-morphism, f, the processing unit 102 carries out the traversal by determining whether the depth of the given M-morphism, f, is less than a given depth value, d. If, for example, the given M-morphism, f, is a composite of two morphisms h and j, called hj, and neither of h and j are composites, then the "depth" of the given M-morphism, f, is 2. Next, the processing unit 102 carries out the traversal by determining the target column, tr, of the given M-morphism, f. The processing unit 102 further carries out the traversal by determining a list, V, of M-morphisms for which the column tr is the source column. In other words, V is the list of all M-morphisms pointing out of column tr. The processing unit 102 further carries out the traversal by iterating over the list, V, doing the following at each iteration. The processing unit 102 selects an element from the list, V. The selected elements may be called the M-morphism g. The processing unit 102 determines whether either f or g represent unique keys. An M-morphism is considered a unique key if either the source column or the target column contains unique values (i.e., no value is seen more than once in the column). Upon determining that either f or g represent unique keys, the iteration may be considered complete and the processing unit 102 may select a new element from the list, V. The processing unit 102 may check that the M-morphism, g, is not already in the composite, f, i.e., the processing unit 102 does not wish to intersect itself. Upon determining that the M-morphism, g, is in the composite, f, the iteration may be considered complete and the processing unit 102 may select a new element from the list, V. The processing unit 102 may then compose f and g together to produce a new M-morphism, called gf. The processing unit 102 may then determine whether the decision metric of gf is below a decision metric threshold. Upon determining that the decision metric of gf is above the decision metric threshold, the processing unit 102 may store the composite gf in a composites list, LC. Upon determining that the decision metric of gf is below the decision metric threshold, the iteration may be considered complete and the processing unit 102 may select a new element from the list, V. The processing unit 102 may recursively carry out this method, passing in the new composite, gf, instead of f. Upon completion, the plurality of chains may be considered to have been produced (step 502) in that the plurality of chains are the elements in the composites list, LC.

It should be clear that further processing fewer than all of the plurality of chains of M-morphisms may still result in a beneficial effect. Accordingly, the system 100 may select (step 504), from among the plurality of chains of M-morphisms, a subset of chains of M-morphisms. The selecting (step 504) may be based on a morphism chain metric. In particular, chains of M-morphisms in the selected subset of chains of M-morphisms may be the chains of M-morphisms that are associated with a value of the morphism chain metric below a morphism chain metric threshold.

The system 100 may obtain (step 506) a plurality of equations of a finitely presented category, D. The obtaining (step 506) of the plurality of equations of the finitely presented category, D, may, for example, involve using a system trained using a gradient descent algorithm.

The system 100 may assign (step 508) an equation metric to each equation in the plurality of equations. The equation metric may be a metric based on a Kullback-Leibler divergence.

The system 100 may then select (step 510) a plurality of selected equations among the plurality of equations. The selecting (step 510) may, for example, be based upon the equation metric assigned (step 508) to each equation among the plurality of equations. In particular, the plurality of selected equations may be the equations associated with a value of the equation metric below an equation metric threshold.

Figure 6:
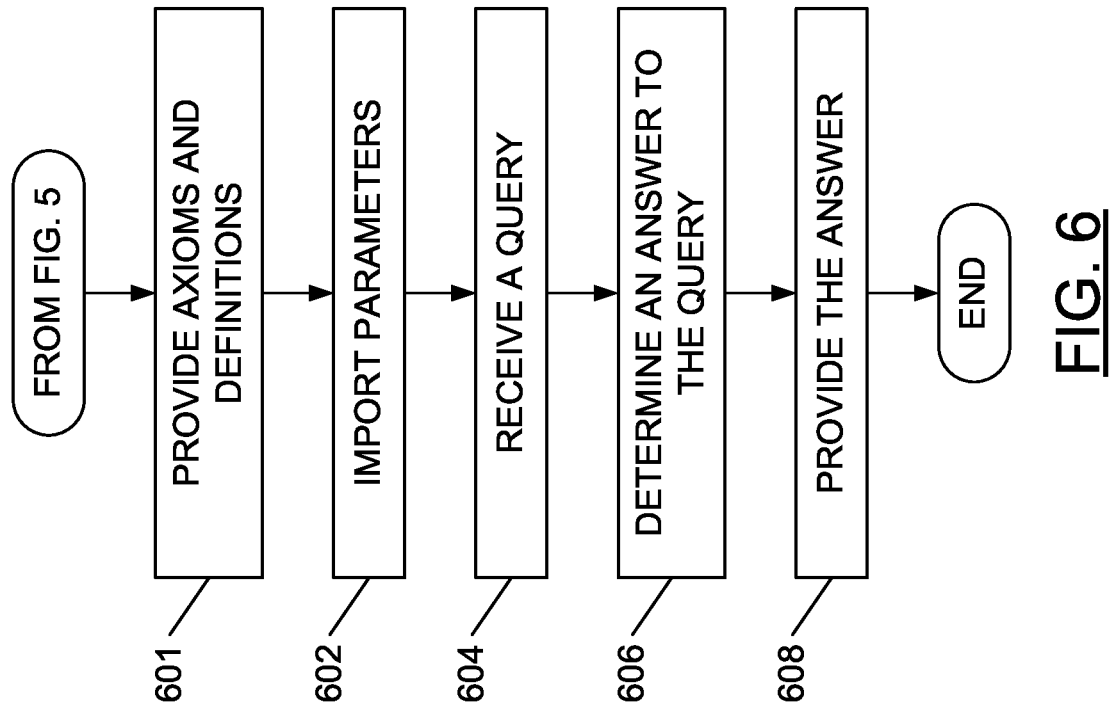
FIG. 6 illustrates example steps of operating an automatic theorem prover implemented by the system of FIG. 1, in accordance with aspects of the present application.

FIG. 6 illustrates example steps of operating an automatic theorem prover implemented by the system 100. The system 100 may provide (step 601), to the automatic theorem prover: axioms of the category, M; a definition of one or more monoidal products defined in the category, M; and axioms associated with the one or more monoidal products. The system 100 may also provide (step 601), to the automatic theorem prover, the one or more universal constructions obtained from the data (see step 208, FIG. 2). The automatic theorem prover may be provided with axioms of a monoidal category. Alternatively, the automatic theorem prover may be provided with axioms of the Kleisli category of the distribution monad. The automatic theorem prover may include a graphical user interface that allows for manual and assisted proofs, thereby taking advantage of the standard composition rule in the category, M, and one or more monoidal products defined in the category, M.

The automatic theorem prover may import (step 602) the plurality of selected M-morphisms, the plurality of selected chains of M-morphisms, the plurality of selected equations and the plurality of associated metrics. The plurality of associated metrics may include the multivariate decision metrics, $m_{mult}$, associated with the multivariate M-morphisms, the morphism chain metrics associated with the plurality of selected chains of M-morphisms and the equation metrics associated with the plurality of selected equations.

The automatic theorem prover may receive (step 604) a query. Receiving (step 604) a query may, for example, involve receiving a query in natural language. The natural language of the query may have grammar that is supported by the axioms that have been provided to the automatic theorem prover. The natural language of the query may have grammar that is supported by monoidal category axioms that have been provided to the automatic theorem prover. The natural language of the query may have grammar that is supported by axioms that have been provided to the automatic theorem prover and wherein the axioms include axioms of a Kleisli Category of a Distribution Monad.

The automatic theorem prover may determine (step 606) an answer to the query. The determining (step 606) of the answer to the query may be based on the plurality of selected M-morphisms, the plurality of selected chains of M-morphisms, the plurality of selected equations and the plurality of associated metrics.

The automatic theorem prover may then provide (step 608) the answer. Notably, the answer, provided (step 608) by the automatic theorem prover, may take the form of a binary answer. That is, the answer may be "true" or "false."

Further notably, where the selecting (step 406, FIG. 4) the set of univariate M-morphisms involves selecting all of the plurality of univariate M-morphisms, the selecting (step 412, FIG. 4) the subset of multivariate M-morphisms involves selecting all of the plurality of multivariate M-morphisms, the selecting (step 504, FIG. 5) the subset of chains of M-morphisms involves selecting all of the plurality of chains of M-morphisms and the selecting (step 510, FIG. 5) the plurality of selected equations involves selecting all the plurality of equations, the answer, provided (step 608) by the automatic theorem prover, may take the form of a metric representative of a degree of confidence that the answer is "true" or a degree of confidence that the answer is "false." The degree may be considered a likelihood.

Notably, it may be understood that there exists a category of states of Kl(D), where Kl(D) is the Kleisli category of the Distribution monad. Objects in the category of states may be shown to be morphisms, $1{\rightarrow}A$, in Kl(D) for some set, A. This may be considered the same as saying that the objects are probability distributions. A morphism from a first morphism, $f{:}1{\rightarrow}A$, to a second morphism, $g{:}1{\rightarrow}B$, may be said to be a third morphism, $A{\rightarrow}B$, in Kl(D) commuting with f and g. This may also be called "the comma category" over the object, 1, in Kl(D). Axioms of the comma category may also be called axioms of 1/KIDM. The term 1/KIDM may be understood to represent the comma category of the one element set in KIDM, also referenced as Kl(D).

Another category may be represented as Kl(G), where Kl(G) is the Kleisli category of the Giry monad. It follows that where 1/Kl(G) is the comma category where 1 is the one-element measurable space.

The importance of 1/KIDM is that 1/KIDM inherits a comonoid structure from KIDM and also has a dagger. The dagger may be shown to allow for a flipping of comonoid structures around, thereby giving category (co) monoid objects and morphisms. These objects and morphisms may be considered both monoid and comonoid structures. (Co) monoid structures may be considered to be essential for having rich natural language semantics in a category. For more detailed information, see Sadrzadeh, Mehrnoosh, Stephen Clark, and Bob Coecke, "The Frobenius anatomy of word meanings I: subject and object relative pronouns." Journal of Logic and Computation 23.6 (2013): 1293-1317 (available at arxiv.org/abs/1404.5278). It may be shown that Frobenius algebras are a special type of (co) monoid structure.

Once a data set has been initialized, as described hereinbefore in conjunction with references to FIG. 2, the data set may be made useful in ways that are distinct from the ways that the data set has been made useful in the foregoing.

Figure 7:
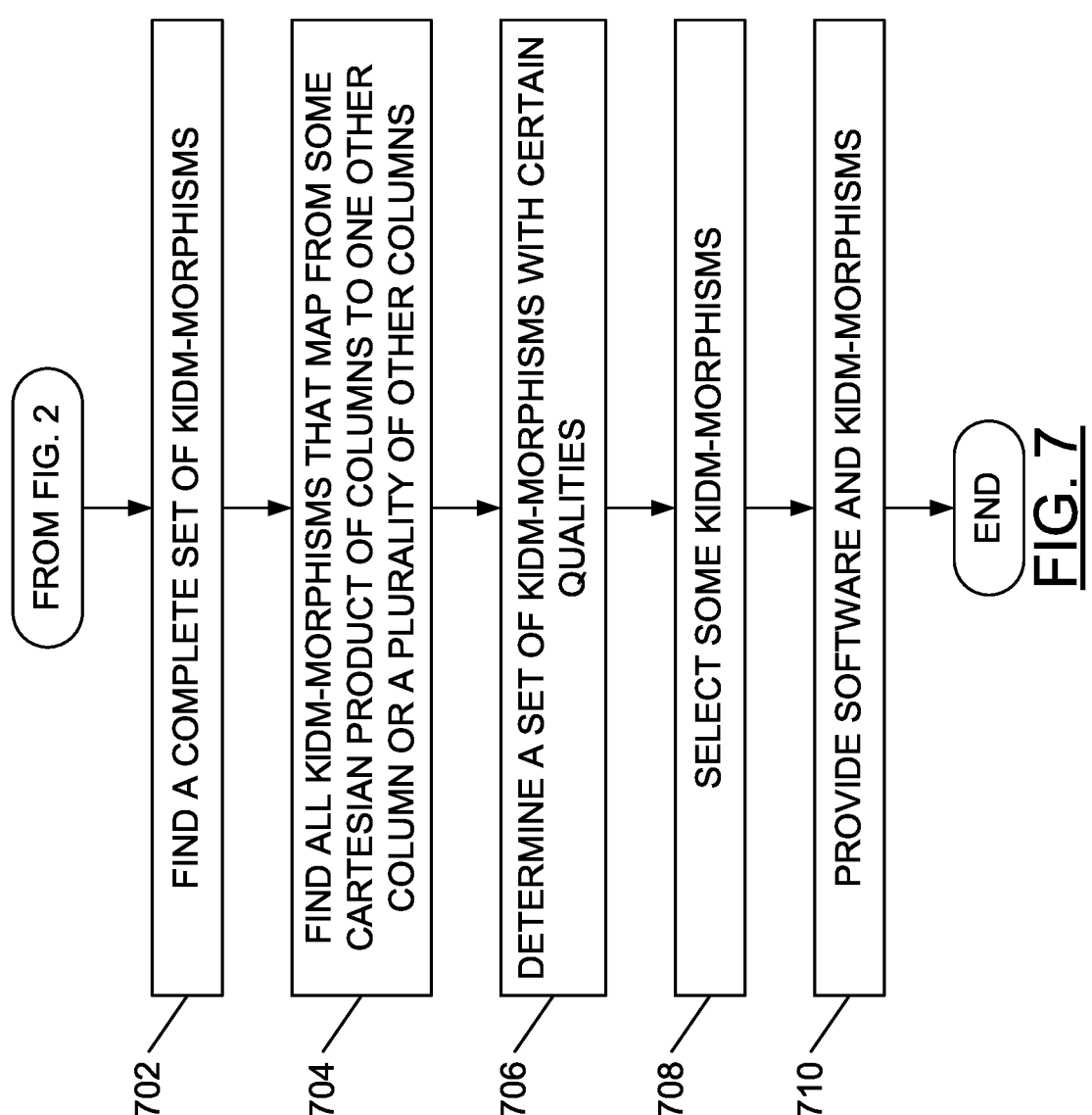
FIG. 7 illustrates example steps in a method started in FIG. 2, as an alternative to the example steps illustrated in FIG. 4, in accordance with aspects of the present application.

FIG. 7 illustrates example steps in a method started in FIG. 2. For each pair of columns remaining in the processed data, the system 100 may convert the data structure, K (already modeled as a morphism in an ambient category, M), to a morphism. The morphism may, for example, be a morphism in the KIDM. Indeed, the converting may be repeated to allow the system 100 to find (step 702) a complete set of KIDM-morphisms into which the data structure, K, may be converted.

One of the main ideas, presented hereinbefore, is the idea of a functor or map from some finitely presented category, C, to a kind of data category M. Examples of these data categories are KIDM or KIMM or 1/Kl(D) or Krn. The data categories are places where one may "see," in a blurry sense, the morphisms of C. This is captured by a functor that maps morphisms in C into M. The categories may be considered to be data categories because it has been discovered that the categories replicate properties of data and data objects, like columns or pairs of columns. It is expected to be possible to find all the axioms of C in M by finding data objects defined by M (just M's morphisms) that reproduce the axioms of C up to certain tolerance metrics, like Kullback-Leibler divergence (discussed hereinbefore) and Total Variational Distance (discussed hereinafter). When one sets out to prove a theorem about C, one has all of its axioms available because the axioms have been found via morphisms in M. One also has the axioms of M. These axioms of M may be called ambient axioms. These ambient axioms are available because of research that has been done to understand these categories. For example, KIDM is a Markov category and, thus, has known axioms. Accordingly, if one has a circuit written in the found morphisms of C (actually they are M morphisms), one may change the circuit according to known axioms. These changes may be accomplished automatically and used to verify theorems, i.e., to prove equations by rewriting one side of the equation to match the other side of the equation.

The system 100 may then find (step 704), among the complete set of univariate KIDM-morphisms, all KIDM-morphisms that map from some cartesian product of columns into one output column. That is, for each column of interest, C, the system 100 may find (step 704) a "correct" cartesian product, Cart, of all other columns that "predict" the column of interest, C. Predicting the column of interest, C, from the cartesian product, Cart, simply means computing a KIDM-morphism from the cartesian product, Cart, to the column of interest, C. Notably, the system 100 may also find (step 704), among the complete set of univariate KIDM-morphisms, KIDM-morphisms that map from some cartesian product of columns into a plurality of output columns, wherein one column, among the plurality of output columns, is the column of interest, C. The quantity of output columns in the plurality may be represented by a variable, $k_{out}$, with the value of $k_{out}$ being, for example, 4.

The system 100 may determine (step 706) a set of KIDM-morphisms with certain qualities. The qualities may include inputs equal to any combination of columns, where the quantity of columns in the combination is fewer than k, for some integer, k. The qualities may include outputs equal to any combination of columns, where the quantity of columns in the combination is fewer than k.

The system 100 may then select (step 708) some KIDM-morphisms from among the set of KIDM-morphisms with certain qualities. In one example, the system 100 may select (step 708) only those KIDM-morphisms, from among the set of KIDM-morphisms with certain qualities, that have a decision metric above a predetermined decision metric threshold.

Alternatively, selecting (step 708) some KIDM-morphisms from among the set of KIDM-morphisms with certain qualities may involve sorting a list of the set of KIDM-morphisms with certain qualities by their respective decision metric. Once the list has been sorted, the system 100 may select (step 708) some KIDM-morphisms in such a way that the total memory value, in, say, Gigabytes, associated with the selected KIDM-morphisms is less than a specified memory value threshold. It should be clear that the system 100 preferably selects (step 708) the KIDM-morphisms that have the optimal decision metric values, i.e., the system 100 preferably selects (step 708) the top KIDM-morphisms in the list that has been sorted in terms of decision metric.

The system 100 may then provide (step 710), to an end-user system (not shown), a software pack. The software pack may include the set of KIDM-morphisms with certain qualities that was determined in step 706. The software pack may also include an indication of those KIDM-morphisms in the set that were selected in step 708. The software pack may further include executable code to allow the end-user system to make use of the provided KIDM-morphisms.

Figure 8:
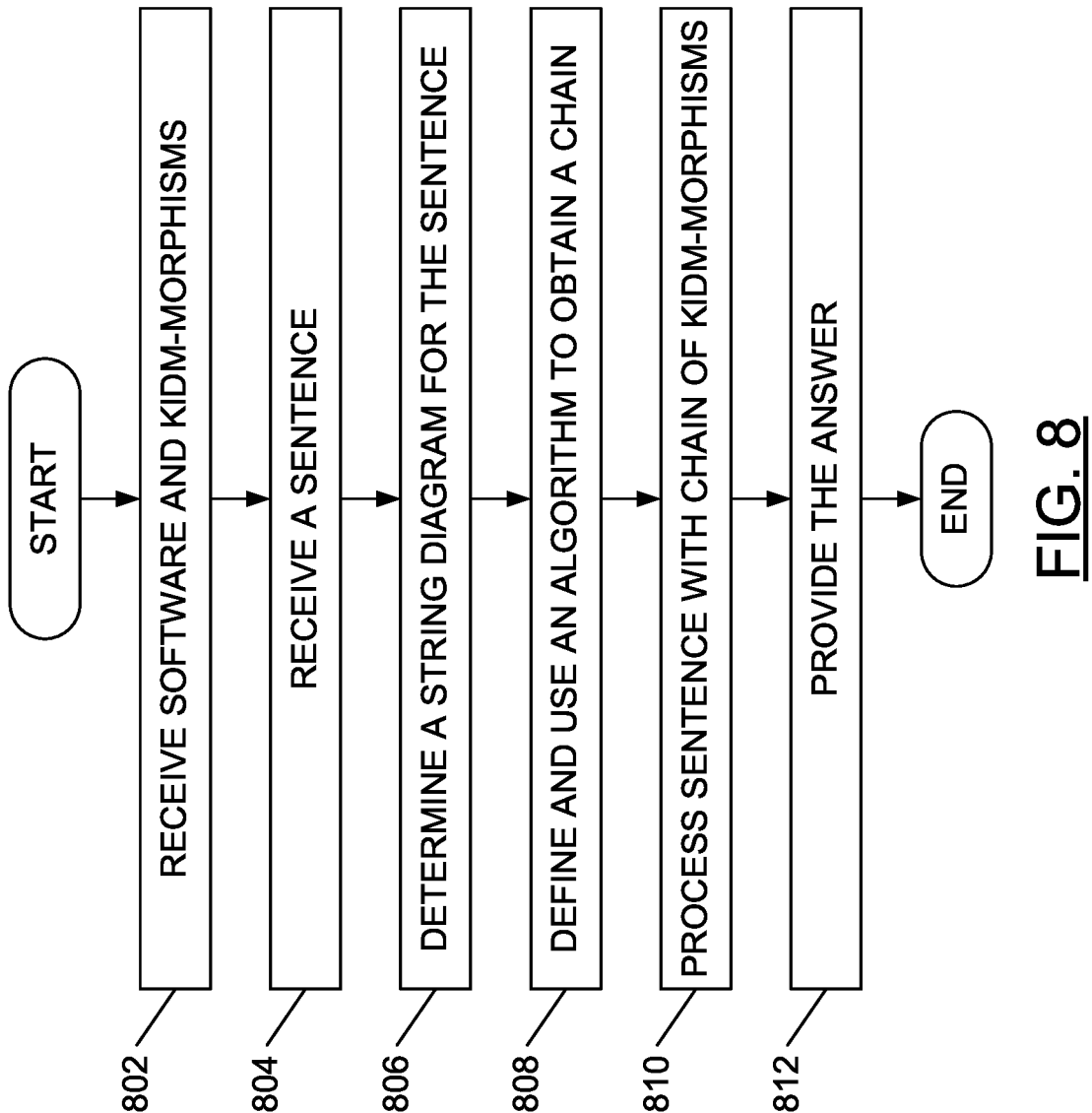
FIG. 8 illustrates example steps in a method of operating an end-user system to verify a received sentence, in accordance with aspects of the present application.

FIG. 8 illustrates example steps in a method of operating the end-user system. Initially, the end-user system receives (step 802) the software pack, including the KIDM-morphisms, provided by the system 100 in step 710.

Operation according to the executable code of the software pack begins with the end-user system receiving (step 804), from an end-user, a sentence. The sentence may be equivalent to the input referenced hereinbefore as a "query." The sentence may be spoken, or typed, in English. There is, of course, no reliance of aspects of the present application on a particular language. However, for the case wherein the processed set of data is representative of English-language data, it follows that the operation of the end-user system should proceed to operate on the basis of input that is received in English.

The natural language of the sentence received in step 804 may have grammar that is supported by axioms that have been provided to the automatic theorem prover. The axioms may include axioms of 1/KIDM, also known as 1/Kl(D).

Operation according to the executable code continues with the end-user system determining (step 806) a "string diagram" for the sentence received in step 804. The string diagram may be understood to identify semantics of the sentence within a context established by the KIDM-morphisms received in step 802.

The end-user system may determine (step 806) the string diagram following a tradition established by Coecke and Sadrzadeh of Vector Space semantics, where the semantics of the software pack are KIDM semantics or Krn semantics. Krn semantics are also known as 1/Kl(D) semantics. In the following, the term 1/Kl(D) semantics will be used with the understanding that the term Krn semantics may be substituted.

As discussed hereinbefore, KIDM is a category with sets as objects and morphisms being morphisms in the Kleisli Category of the Distribution Monad. 1/Kl(D) semantics are similar to KIDM semantics, in that a 1/Kl(D) category is a category that has the same morphisms but the objects are distributions of finite support. In the following, "distributions of finite support" may be simply referenced as "distributions." A coin toss may be seen as an example of an event associated with distributions of finite support. A coin toss has 50% chance of heads and 50% chance of tails. Accordingly, a coin toss may be associated with a distribution with a finite set of outcomes.

So-called "Vector Space semantics" may be shown to use dictionaries of key-value pairs. The key part of the key-value pair is representative of a particular outcome. The value part of the key-value pair is representative of a probability of the particular outcome.

Determining (step 806) the string diagram, at the end-user system, may involve organizing words in the sentence with arrows between the words to show a proper grammatical structure for the sentence. For example, FIG. 9 illustrates a manner in which a string diagram may be determined (step

806) for the sentence "The student who has a good grade due to high difficulty and high intelligence will receive a letter."

Figure 9:
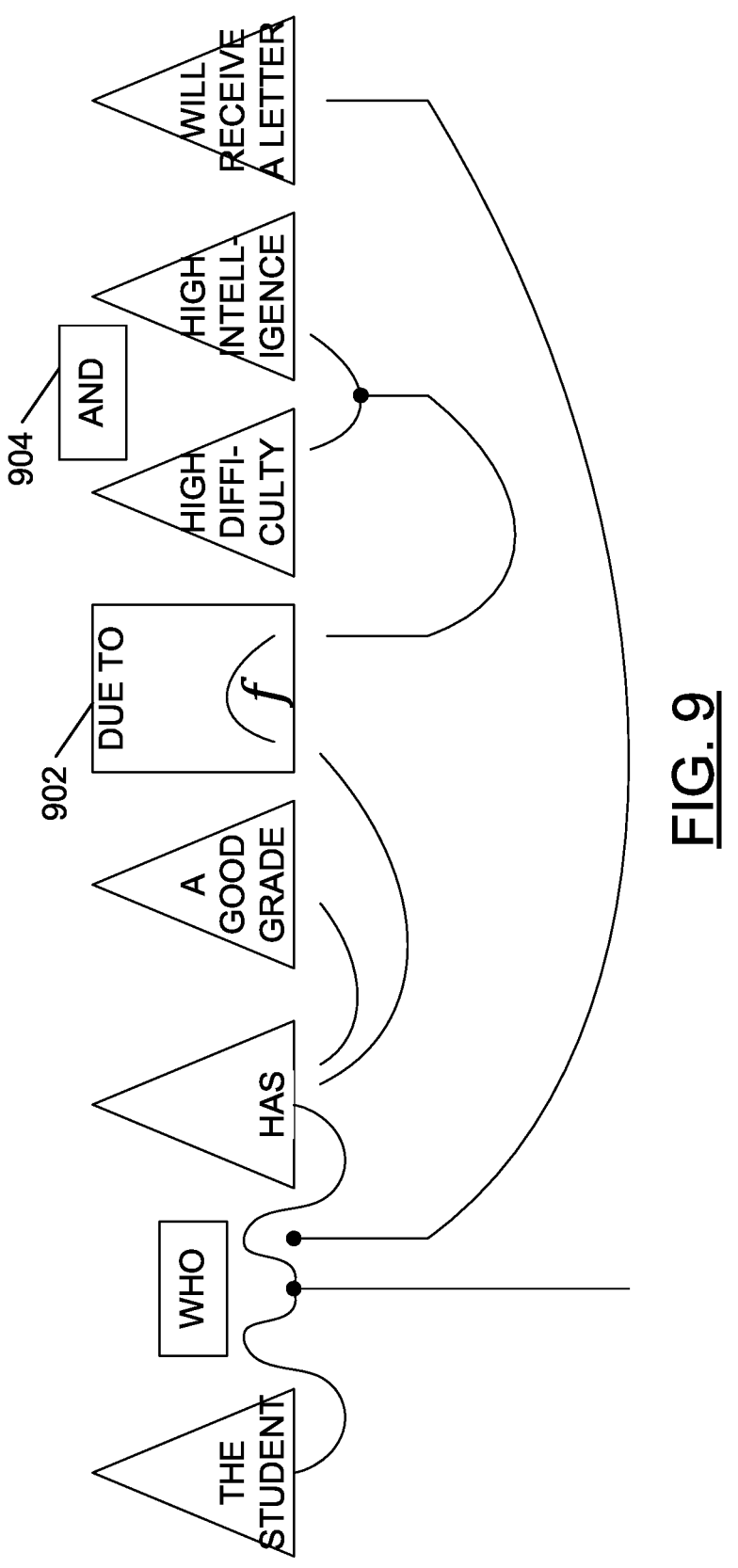
FIG. 9 illustrates a manner in which a string diagram may be determined for a sentence, in accordance with aspects of the present application.

Notably, in FIG. 9, a box 902 labeled "Due to" is associated with a map, "f." The map, f, may be understood to represent a morphism in the 1/Kl(D) category or in the KIDM category.

Additionally, in FIG. 9, a box 904 labeled "And" may be understood to represent a cartesian product of sets or a monoidal product in KIDM. A monoidal product is much like a cartesian product but a monoidal product has axioms that are different from the axioms of a cartesian product (see en.wikipedia.org/wiki/Monoidal_category).

The string diagram is given as a data structure. The data structure for the string diagram may be understood to correspond to a list of objects of type "Gram," that is, each object in the string diagram may be referenced as a "Gram object." A Gram object is known to contain the word to which the Gram object refers. A Gram object is known to have object pointers to other Gram objects in the list of objects. The object pointers are represented, in the string diagram of FIG. 9, as the arcs, or "strings," that connect grammatical parts of the sentence.

The end-user system may next define (step 808, FIG. 8) an algorithm. The purpose of the algorithm is to take, as input, the string diagram data structure and determine, as output, a chain of KIDM morphisms selected from among the KIDM morphisms received in step 802. A chain of KIDM morphisms may also be referenced as a network of KIDM morphisms or a circuit of KIDM morphisms.

Figure 10:
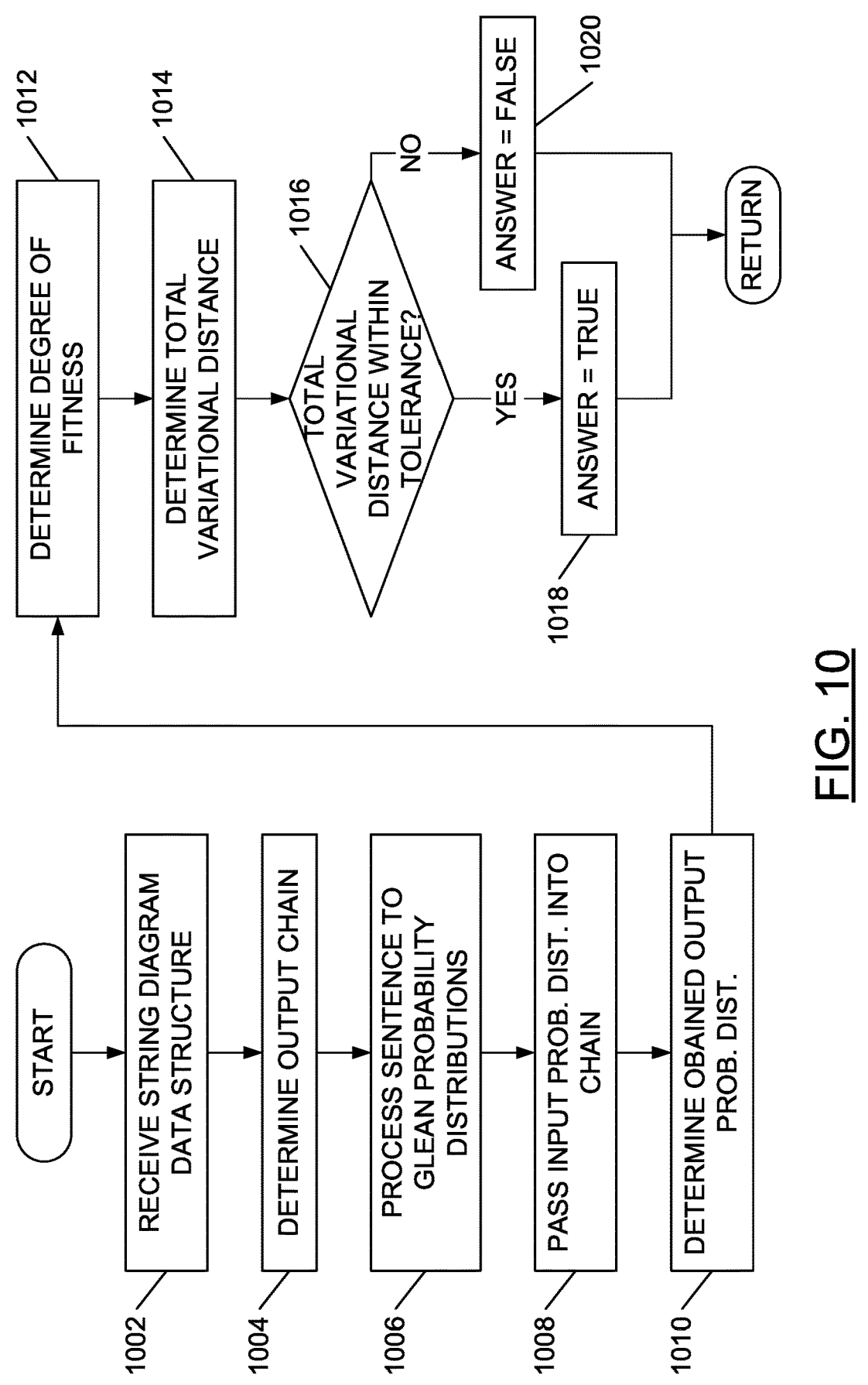
FIG. 10 illustrates example steps in a method of processing the sentence, received in the method of FIG. 8, to obtain an answer, in accordance with aspects of the present application.

The end-user system may next process (step 810) the sentence to obtain an answer. FIG. 10 illustrates example steps in a method, carried out by the end-user system, to process (step 810) the sentence to obtain an answer. Initially, the end-user system may receive (step 1002), as input, the string diagram data structure. The end-user system may next use the algorithm to determine (step 1004), as output, a chain, Circ, of KIDM morphisms. The end-user system may also process (step 1006) the sentence to glean an input probability distribution, $P_{in}$, and a received output probability distribution, $P_{out}$. In the course of processing (step 1006) the sentence, the end-user system may come across an ambiguous, or possibly ambiguous, word. Upon coming across an ambiguous word, the end-user system may invoke a component of the user interface to obtain, from the user, an approximate value for the input probability distribution, $P_{in}$, or the output probability distribution, $P_{out}$, or both. For example, the user interface may present an input box that indicates "In the received sentence, there is a condition that is associated with the word ALWAYS. For improved accuracy, please indicate an approximate percentage of time that the condition will be true. The user interface may present a drop down list with selectable list items representative of an approximate percentage of time that the condition will be true. For example, one list item may be 90% and another list item may be 95%. The end-user system may pass (step 1008) the input probability distribution, $P_{in}$, into the chain, Circ, of KIDM morphisms. Responsive to using the chain, Circ, of KIDM morphisms to process (step 1008) the input probability distribution, $P_{in}$, the end-user system may determine (step 1010) an obtained output probability distribution, $P_{Circ}$. The end-user system may then determine (step 1012) a degree of fitness of the chain, Circ, of KIDM morphisms. A normalized conditional entropy, $CE_{Circ}$, may be used to represent a degree of fitness of the chain, Circ, of KIDM morphisms. The end-user system may then determine (step 1014) a normalized total variational distance, VD, between the received output probability distribution, $P_{out}$, and the obtained output probability distribution, $P_{Circ}$.

The end-user system may then provide (step 812), to the end-user, the answer to the sentence. Recall that the end-user provided the sentence received in step 804. Responsive to the end-user system determining (step 1016) that the total variational distance, VD, is within a tolerance, the end-user system may associate (step 1018) the answer with a value of "True." The determining (step 1016) that the total variational distance, VD, is within a tolerance may be accomplished by determining that the total variational distance, VD, does not exceed a threshold. Additionally, as part of providing (step 812), to the end-user, the answer to the sentence, the end-user system may provide an indication of the degree of fitness, $CE_{Circ}$, of the chain, Circ, of KIDM morphisms and an indication of the total variational distance, VD. Responsive to the end-user system determining (step 1016) that the total variational distance, VD, is not within a tolerance, the end-user system may associate (step 1020) the answer with a value of "False."

Providing (step 812, FIG. 8), to the end-user, the answer may, for example, involve controlling a user interface to display a "True" indication or a "False" indication. The controlling of the user interface may involve causing a display of a particular color code associated with a "True" answer and a distinct color code associated with a "False" answer. The controlling of the user interface may also involve causing the display to provide a form of visual feedback representative of a strength of the answer. That is, the visual feedback may quickly indicate the degree of fitness, $CE_{Circ}$, of the chain, Circ, of KIDM morphisms and quickly indicate the total variational distance, VD.

Figures 11A, 11B, 11C:
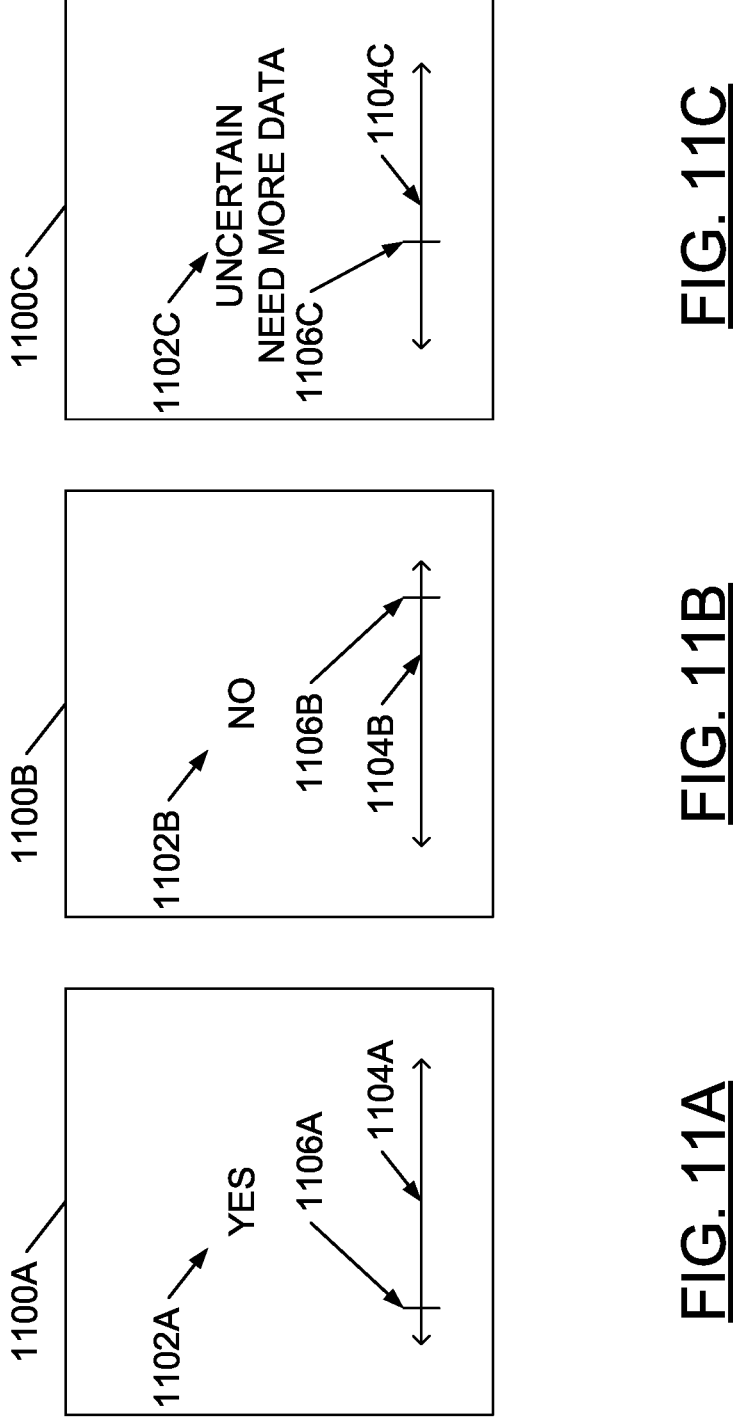
FIG. 11A illustrates an example first user interface object for providing the answer obtained in the method of FIG. 10, in accordance with aspects of the present application.
FIG. 11B illustrates an example second user interface object for providing the answer obtained in the method of FIG. 10, in accordance with aspects of the present application.
FIG. 11C illustrates an example third user interface object for providing the answer obtained in the method of FIG. 10, in accordance with aspects of the present application.

FIG. 11A illustrates an example first user interface object 1100A. The first user interface object 1100A includes a first answer indication word 1102A. The first answer indication word 1102A in FIG. 11A is "YES." The first user interface object 1100A also includes a first degree of fitness bar 1104A. The first user interface object 1100A further includes a first degree of fitness indicator 1106A positioned along the first degree of fitness bar 1104A.

FIG. 11B illustrates an example second user interface object 1100B. The second user interface object 1100B includes a second answer indication word 1102B. The second answer indication word 1102B in FIG. 11B is "NO." The second user interface object 1100B also includes a second degree of fitness bar 1104B. The second user interface object 1100B further includes a second degree of fitness indicator 1106B positioned along the second degree of fitness bar 1104B.

FIG. 11C illustrates an example third user interface object 1100C. The third user interface object 1100C includes a third answer indication word 1102A. The third answer indication word 1102C in FIG. 11C is "UNCERTAIN." The third user interface object 1100C also includes a third degree of fitness bar 1104C. The third user interface object 1100C further includes a third degree of fitness indicator 1106C positioned along the third degree of fitness bar 1104C.

Figure 12:
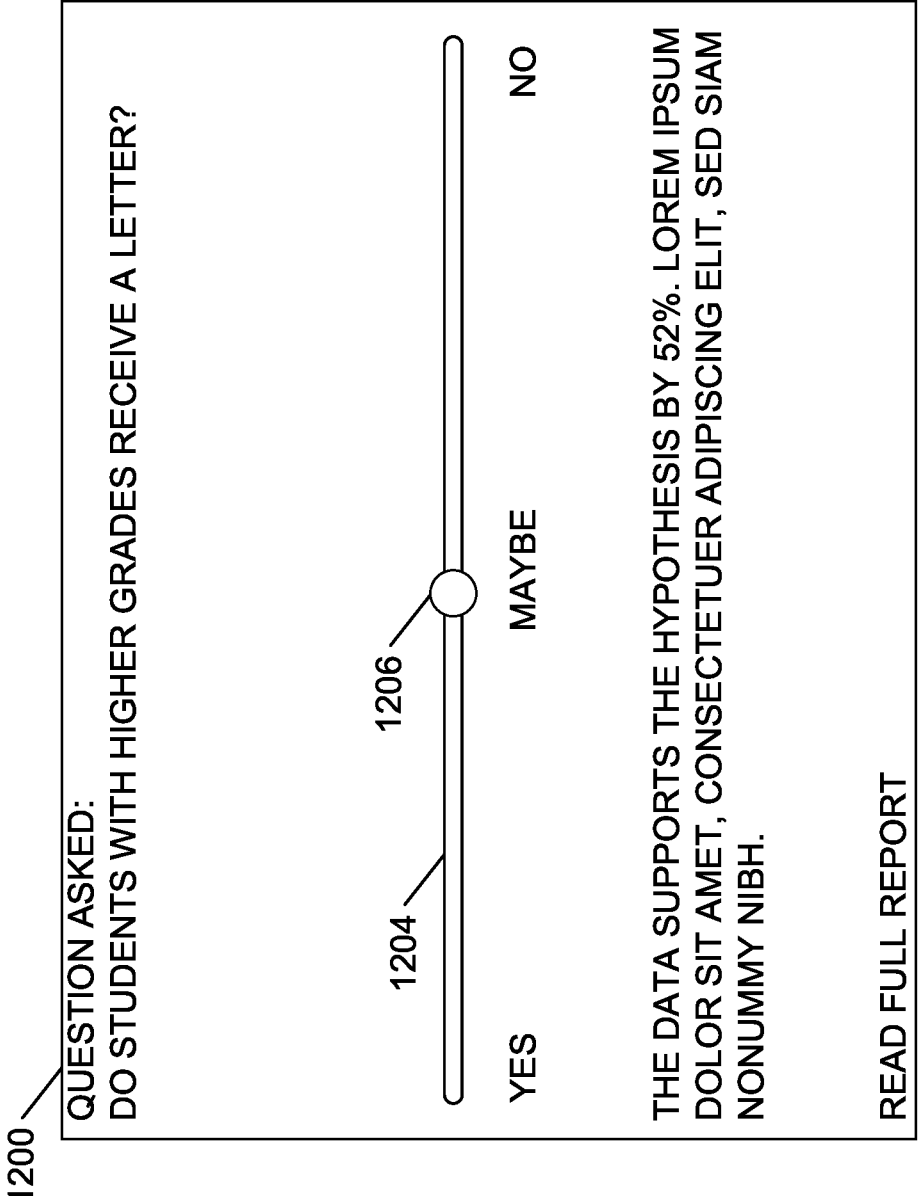
FIG. 12 illustrates an example fourth user interface object for providing the answer obtained in the method of FIG. 10, in accordance with aspects of the present application.

FIG. 12 illustrates an example fourth user interface object 1200. The fourth user interface object 1200 includes a restatement of the sentence that is being evaluated. The fourth user interface object 1200 includes a fourth degree of fitness bar 1204. The fourth user interface object 1200 also includes a fourth degree of fitness indicator 1206 positioned along the fourth degree of fitness bar 1204.

There are at least three metrics of fitness that may be of interest to the user. A first metric is the total variational distance between the received output probability distribution, $P_{out}$, and the obtained output probability distribution, $P_{Circ}$. The greater the total variational distance between $P_{out}$ and $P_{Circ}$, the more incorrect the obtained output probability distribution, $P_{Circ}$, may be understood to be.

Recall that the end-user system is to define (step 808, FIG. 8) an algorithm, where the purpose of the algorithm is to take, as input, the string diagram data structure and determine, as output, a chain of KIDM morphisms selected from among the KIDM morphisms received in step 802. The second metric is representative of the conditional entropy of the chain of KIDM morphisms determined (step 1004, FIG. 10) for the sentence. The third metric is representative of the entropy of the obtained output probability distribution, $P_{Circ}$. It may be shown that the third metric is related to the second metric, the conditional entropy of the chain of KIDM morphisms determined (step 1004, FIG. 10) for the sentence.

These three metrics may be presented, to the user in the user interface, to encourage the user to "dig deeper." The presentation, to the user, of these three metrics may assist the user to understand a degree to which there is something wrong with the sentence. Responsive to determining that the entropy of the obtained output probability distribution, $P_{Circ}$, is relatively high, the end-user system may cause the user interface to present so-called "candlesticks" of probability showing how various components of the sentence contribute to a high entropy. Thus, the user may obtain an initial understanding of an identity of the KIDM morphisms that have been determined (step 1004) for the sentence are the "not good" KIDM morphisms. If the conditional entropy of certain ones of the KIDM morphisms is bad (closer to 1 than 0), then the user interface may present, to the user, an alternate KIDM morphism. The alternate KIDM morphism may have the same output but with more/different inputs. The alternate KIDM morphism may have a low conditional entropy. It may be that the alternate KIDM morphism was precomputed and received (step 802, FIG. 8) with the software. The user interface may present, to the user, the candlesticks of probability corresponding to use of the alternate KIDM morphism with the low entropy for the obtained output probability distribution, $P_{Circ}$. This approach may be shown to teach the user the real predictors of success so that the user can understand why the AI system chose those columns. The user may choose not to believe the AI system because the result in unexpected. If it is found that all the KIDM morphisms used in the sentence are good (low metric) and the received output probability distribution, $P_{out}$, is far from the obtained output probability distribution, $P_{Circ}$, then the user interface may indicate that the sentence is definitely wrong, with the meter or slider (such as the fourth degree of fitness indicator 1206 in FIG. 12) over the end associated with "False" or NO."

KIDM morphisms are known to be stochastic matrices that may be used to map discrete probability distributions to discrete probability distributions. For this reason, the end-user system may be configured to create a particular probability distribution that represents a fragment of a sentence received in step 804. For instance, in the sentence "Students who get a good grade due to high difficulty and high intelligence always receive a favorable letter," the term "always" is used. As discussed hereinbefore, the user interface may request clarification regarding what they mean by the term "always." The user interface may pose "Do you mean 90%, 95% or 99%?" and provide a drop down pick list. Responsive to the user interface receiving input indicative of the user having chosen 90% from the drop down pick list, then the system 100 may be shown to produce an output probability distribution, $P_{out}$=(10%|Unfavorable+90%|Favorable). The end-user system may then process (step 810) the particular probability distribution using the chain of KIDM morphisms obtained in step 808. A result of the processing (step 810) of the particular probability distribution using the chain of KIDM morphisms may be a new state probability distribution. The new state probability distribution may be used to verify the hypothesis of the user.

In an aspects of the present application, an algorithm may be defined to receive an English sentence and discover probability distributions that are of interest to the user.

For example, the end-user system may receive the example sentence of FIG. 9. The sentence is "Students who have a good grade due to high difficulty and high intelligence always receive a favorable letter."

Execution of the software on the end-user system may allow, through use of a user interface, the executing software to request, from the user, input that may act to define the expression "high difficulty" and the expression "high intelligence" in terms of a probability that a student has "high Intelligence" and in terms of a probability that the student is to write a "difficult test." The user may provide input that indicates that the student in question has a 90% probability of having high intelligence. The user may also provide input that indicates that the student in question has a greater than 90% probability of being asked to write a difficult test. Accordingly, the executing software may return a discrete probability distribution, ψ, where ψ=0.9|high DifficultyXHigh Intelligence>+0.1|high difficultyXLow Intelligence>.

Aspects of the present application relate to obtaining (step 808) a chain of KIDM morphisms of interest. The chain of KIDM morphisms may allow a hypothesis sentence about a specific state of affairs to be verified. The hypothesis sentence can be written down as a probability distribution. For instance, the hypothesis sentence "Students always received favorable reference letters" would imply that the probability of receiving a favorable reference letter is above, say, 90%. That is, the hypothesis sentence may be expressed as a discrete probability distribution, ψ, where ψ=.1|Unfavorable>+0.9|Favourable>.

The hypothesis sentence may be verified by processing an input discrete probability distribution, ψ, of interest using the chain of KIDM morphisms to produce a plurality of "output" or "result" probabilities, i.e., an output discrete probability distribution. For instance, a sentence like "Students always received favorable reference letters when they have good grades." can start with an input discrete probability distribution, v, and a channel (i.e., a KIDM morphism) that maps distributions over Grades to distributions over Letters. The sentence fragment "Good grades" can be seen as a discrete probability distribution, K, where K=100%|Good grades>. To verify the hypothesis sentence, the hypothesis sentence may be processed using the chain of KIDM morphisms. If an output discrete probability distribution resulting from the processing is more than 90% weighted toward favorable letters, the end-user system may indicate that the hypothesis sentence has been verified.

To improve confidence, on the part of the user, that the data supports verification of the hypothesis sentence, the chain of KIDM morphisms that was used to verify the hypothesis sentence may be displayed to the user in a user interface. The display in the user interface may be enhanced to highlight column names and words that were used as aspects of the chain of KIDM morphisms.

Figure 13:
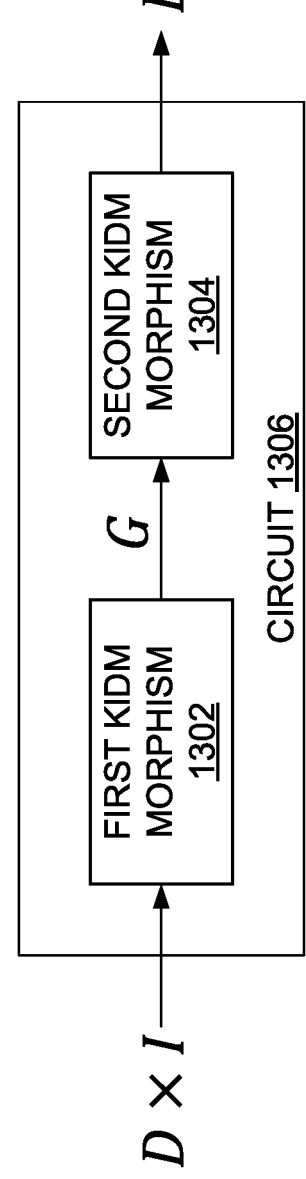
FIG. 13 illustrates an example user interface display to be used for improving confidence, on the part of the user, that the data supports verification of a sentence, in accordance with aspects of the present application.

FIG. 13 illustrates an example user interface display to be used for improving confidence, on the part of the user, that the data supports verification of the hypothesis sentence. FIG. 13 illustrates a simple network 1300. The simple network 1300 includes a cartesian product, D×I, of difficulty, D, and intelligence, I, used as input to a first KIDM morphism 1302. The first KIDM morphism 1302 may be shown to map the cartesian product, D×I, to a grade, G. The grade, G, may be used as input to a second KIDM morphism 1304. The second KIDM morphism 1304 may be shown to map the grade, G, to a letter, L. The first KIDM morphism 1302 and the second KIDM morphism 1304 may be stringed together in a circuit 1306 to map the cartesian product, D×I, to the letter, L.

Figure 14:
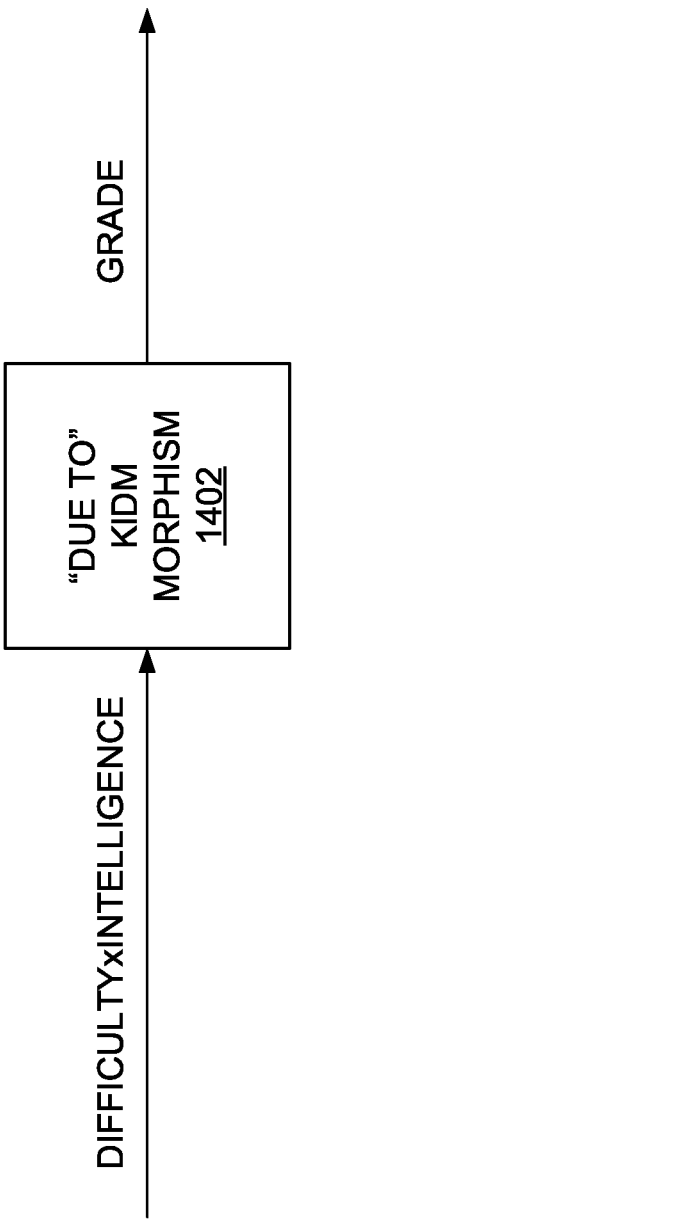
FIG. 14 illustrates an example user interface display to be used for improving confidence, on the part of the user, that the data supports verification of a sentence, as an alternative to the example of FIG. 13, in accordance with aspects of the present application.

It may be that the user does not necessarily recognize that the cartesian product, D×I, in FIG. 13, is representative of a cartesian product of difficulty and intelligence. Furthermore, it may be that the user does not necessarily recognize that the letter "G" is representative of a grade. Accordingly, a portion of the example user interface display of FIG. 13 may be reconfigured as illustrated in FIG. 14. The example user interface display of FIG. 14 includes a "DUE TO" KIDM morphism 1402. The "DUE TO" KIDM morphism 1402 may be considered to correspond to the box 902 labeled "Due to" that is associated with the map, f, in FIG. 9. The "DUE TO" KIDM morphism 1402 is illustrated in FIG. 14 as receiving, as input, the cartesian product of difficulty and intelligence. The "DUE TO" KIDM morphism 1402 is illustrated in FIG. 14 as providing, as output, a grade.

The foregoing includes extensive discussion centered around Kl(D). It is notable that there is a category that is better than Kl(D) in certain circumstances. This category is Kl(Pow), where Pow is the powerset monad on sets and Kl(Pow) is the Kleisli category of the powerset monad. Kl(Pow) is known as Rel, the category of sets and relations.

It should be appreciated that one or more steps of the embodiment methods provided herein may be performed by corresponding units or modules. For example, data may be transmitted by a transmitting unit or a transmitting module. Data may be received by a receiving unit or a receiving module. Data may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments.

Although this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A computer-implemented method for providing verification of a natural language sentence, the method executed by one or more processing units and comprising:

receiving a plurality of morphisms, wherein the receiving employs an input interface coupled to the one or more processing units and wherein the plurality of morphisms are encoded as computational objects in an ambient category data structure stored in memory;

receiving, using the input interface, the natural language sentence encoded as a object sequence and an associated input discrete probability distribution over the objects;

analyzing the natural language sentence using a module executed by the one or more processing units to:

select a subset of morphisms from among the plurality of morphisms based on morphisms in the subset being associated with optimum values for a multivariate decision metric;

obtain a chain of the subset of morphisms as an ordered data structure; and obtain a received output discrete probability distribution for the object sequence;

obtaining, by processing the input discrete probability distribution using the chain of the subset of morphisms by executing the chain on the input discrete probability distribution using, on the one or more processing units, numerical linear algebra operations, an obtained output discrete probability distribution;

determining a normalized total variational distance between the received output probability distribution and the obtained output probability distribution;

determining, from the obtained output discrete probability distribution, that the natural language sentence has been verified by applying a verification decision module that implements a comparison rules to determine that the normalized total variational distance does not exceed a threshold; and providing, as output, an indication that the natural language sentence has been verified, wherein the providing employs an output interface and wherein the indication includes a "true" indication and an indication of a degree of fitness of the chain of morphisms.

2. The method of claim 1, wherein the ambient category is 1/Kl(D), whose objects are discrete probability states.

3. The method of claim 2, wherein the morphisms comprise stochastic matrices.

4. The method of claim 2, wherein the morphisms comprise morphisms in the Kleisli category of the Distribution Monad.

5. The method of claim 1, wherein the ambient category is 1/Kl(D), whose objects are discrete probability vectors.

6. The method of claim 5, wherein the morphisms comprise stochastic matrices.

7. The method of claim 5, wherein the morphisms comprise morphisms in the Kleisli category of the Distribution Monad.

8. The method of claim 1, further comprising controlling a display to present information representative of a manner by which the natural language sentence has been verified.

9. The method of claim 1, wherein grammar of the natural language sentence is supported by axioms.

10. The method of claim 9, wherein the axioms include axioms of 1/KIDM.

11. The method of claim 9, wherein the axioms include axioms of 1/Kl(G).

12. The method of claim 1, wherein the ambient category is Kl(M), whose objects comprise sets and whose morphisms are Kleisli morphisms of the multiset monad.

13. The method of claim 1, wherein the ambient category is Kl(M), whose objects comprise multisets and whose morphisms are morphisms of the Kleisli category of the multiset monad.

14. The method of claim 1, wherein the ambient category is Kl(Pow), whose objects comprise sets and whose morphisms are morphisms in the Kleisli category of the powerset monad.

* * * * *